(12) United States Patent
Trussler

(10) Patent No.: US 10,079,480 B2
(45) Date of Patent: Sep. 18, 2018

(54) WATER RESISTANT ARC RESISTANT OUTDOOR SWITCHGEAR AIR VENT

(71) Applicant: SCHNEIDER ELECTRIC USA, INC., Palatine, IL (US)

(72) Inventor: Richard M. Trussler, Murfreesboro, TN (US)

(73) Assignee: Schneider Electric USA, Inc., Andover, MA (US)

(*) Notice: Subject to any disclaimer, the term of this patent is extended or adjusted under 35 U.S.C. 154(b) by 292 days.

(21) Appl. No.: 14/875,832

(22) Filed: Oct. 6, 2015

(65) Prior Publication Data

US 2017/0098924 A1    Apr. 6, 2017

(51) Int. Cl.
H02B 1/56 (2006.01)
H02B 13/025 (2006.01)

(52) U.S. Cl.
CPC .......... *H02B 13/025* (2013.01); *H02B 1/565* (2013.01)

(58) Field of Classification Search
CPC ........ H02B 13/025; H02B 1/565; H02B 1/56; F24F 1/00; F24F 11/00; F24F 2203/00; F24F 2221/00; F24F 11/0009; F24F 11/0098; F24F 13/084; F24F 2011/0098; F24F 13/222; H05K 5/00; H05K 7/00; H05K 10/00; H05K 13/00; H05K 9/00
USPC ...................... 454/239, 184, 363, 367; 52/95
See application file for complete search history.

(56) References Cited

U.S. PATENT DOCUMENTS

| | | | |
|---|---|---|---|
| 5,574,624 A | 11/1996 | Rennie et al. | |
| 7,034,242 B1* | 4/2006 | Shea | H01H 9/362 218/149 |
| 7,722,449 B2* | 5/2010 | Nowak | F24F 13/082 454/270 |
| 7,778,013 B2 | 8/2010 | Bruski et al. | |
| 7,952,042 B2* | 5/2011 | Coomer | F16J 3/041 200/293 |
| 7,952,857 B1* | 5/2011 | Motley | H02B 1/56 361/678 |
| 9,117,607 B2 | 8/2015 | Page, II | |
| 2015/0093985 A1* | 4/2015 | Towner | F24F 13/20 454/363 |
| 2016/0043532 A1* | 2/2016 | Zende | H02B 13/025 361/611 |

* cited by examiner

*Primary Examiner* — Gregory Huson
*Assistant Examiner* — Ryan Faulkner
(74) *Attorney, Agent, or Firm* — Locke Lord LLP

(57) ABSTRACT

An arc resistant air vent for a switch gear cabinet comprises a plenum stacked with spaced corrugated plates, the plates being perforated by slots at the corrugation turning points. Air and water can enter through a front grille of the vent. Air is allowed to pass through to the cabinet while water entering the vent is returned through the perforations to a bottom wall of the plenum which drains at the grille. The plates are held in frangible connections to the side walls of the plenum and the slots produce an accordion hinge to allow a release and a folding of the plates together under the pressure of an arc blast in the switchgear cabinet to seal the grille.

7 Claims, 3 Drawing Sheets

WATER RESISTANT ARC RESISTANT OUTDOOR SWITCHGEAR AIR VENT

BACKGROUND OF THE INVENTION

1. Field of the Invention

The present invention relates to a vent system for electrical equipment enclosures, and in particular, to a vent for enhanced arc protection configured to prevent the arc gas and plasma from an arc blast from escaping electrical enclosures.

2. Description of Related Art

Switchgear enclosures are commonly employed in electrical power distribution systems for enclosing circuit breakers and other switching equipment associated with the distribution system. Typically, switchgear enclosures are comprised of a number of individual stacked or adjacent compartments, and receive electrical power from a power source and distribute the electrical power through one or more feeder circuits to one or more loads. Switchgear enclosures typically include circuit protection devices for interrupting electric power in a particular feeder circuit in response to hazardous current overloads in the circuit. A circuit protection device in electrical equipment can be a circuit breaker, fuse and switch combination, contactor and fuse combination or any other device intended to break or protect the load or secondary side of a circuit.

Switchgear or switchgear cabinet is a general term for an electrical enclosure encompassing switching and interrupting devices and their combination with associated control, instruments, metering, protective and regulating devices, and assemblies of these devices with associated interconnections, accessories, and supporting structures used primarily in connection with the generation, transmission, distribution, and conversion of electric power. Switchgear characteristics are described in ANSI/IEEE (American National Standards Institute/Institute of Electrical and Electronics Engineers) Standard No. C37.20.1, C37.20.2, C37.20.3-1999. However, embodiments of the present invention can be used in many other types of electrical equipment where arc resistant venting is required.

The specified temperature limits applicable to switchgear assemblies are given in the above referenced standards. The rated continuous current of metal-enclosed (ME) switchgear is the maximum current that can be carried continuously by the primary circuit components, including buses and connections, without producing a temperature in excess of specified limits for any primary or secondary circuit component, any insulating medium, or any structural or enclosing member. The continuous current ratings of the main bus in ME switchgear are also defined by the above referenced standards. Thus, outside air is often drawn through the switchgear cabinet to cool its operation.

In addition to current overloads, switchgear enclosures may encounter other hazardous conditions known as arcing faults. Arcing faults occur when electric current "arcs," flowing through ionized gas between conductors, such as between two ends of broken or damaged conductors, or between a conductor and ground in a switchgear enclosure. Arcing faults typically result from corroded, worn or aged wiring or insulation, loose connections and electrical stress caused by repeated overloading, lightning strikes, etc. During an internal arc event in an electrical enclosure, conductors and surrounding material are vaporized and converted to plasma and arc gas. The massive rate of expansion of the plasma and arc gas, i.e. the arc blast, may expose personnel outside the equipment to dangerous levels of energy. In some instances, electrical equipment contains components that require external ventilation openings in the equipment enclosure. During an arc event in such an enclosure, the ventilation openings might provide a means for the dangerous energy to propagate outside the equipment, and could provide exposure to personnel standing in front of the equipment.

SUMMARY OF THE INVENTION

Thus, there exists a need in the art for a means of providing an adequate level of ventilation in the enclosure to keep the components cool (therefore preventing premature end-of-life), while at the same time providing a solution that prevents dangerous levels of energy from propagating outside the equipment. Aspects and embodiments disclosed herein meet these needs and others by providing a ventilation system for enhanced arc protection and limited ingress of water and debris to the enclosure.

In view of the foregoing, one aspect of the present invention provides a Arc Resistant Air Vent for enhanced arc protection that allows outside air to flow into the cabinet, while preventing or discouraging water entry through the vent, e.g. a NEMA 3R enclosure. In the case of an internal arc event within the cabinet, exhaust arc gas and plasma should not be vented directly out of the cabinet where persons may be located. Thus a cooling vent according to the present invention will have a type of check valve system which provides an increased margin of safety for personnel in the area.

The vent may be in the form of a modular box anchored in a switchgear cabinet that contains a baffled plenum which allows good ventilation of the enclosure for components that require cooling and which seals itself under the pressure of an arc blast.

In one aspect of the present invention an arc resistant air vent for an electrical enclosure is presented comprising a plenum enclosure with sides built to withstand rupture during an arc blast, with an open front wall and an open back wall, and side walls arranged to accept and support corrugated baffle plates; a grille covering the open front wall of the plenum, a stack of baffle plates in the plenum being corrugated plates stacked in a spaced and preferably parallel relationship, each plate having a plurality of perforations along each ridge and furrow of the corrugations, and each ridge or furrow, or both, having an attachment tab at both sides for connection with a corresponding side wall of the plenum to maintain the spaced relationship normally but which are too weak to maintain connection integrity under a force produced by an arc blast; with one of the uppermost or lowermost baffle plates being an outside plate and ending in an extended fold toward the back wall of the plenum capable of contacting the last fold of the opposite outside plate, i.e. the farthest plate therefrom in the stack, when bent towards the front wall; and whereby the perforations and tabs produce an accordion hinge to allow a folding of the plates together under the force of an arc blast in the switchgear cabinet.

In certain aspects of the invention it is preferable that the bottom wall of the plenum enclosure be a drip pan open only to the grille from draining of water out of the air vent. In other aspects it is preferable that the gap between each plate is less than the height of the corrugations.

In other aspects the vent front is a vertical plate with multiple slots arranged to from a grille, allowing air and wind-blown or sprayed water into the assembly. The baffle plates allow air to pass all the way through the vent but will stop water, which drips through the furrows to the floor of the plenum. The floor of the plenum is arranged as a bottom tray of three sides but with no lip at the front grille so water can flow out the front of the vent.

The tabs that support the corrugated baffle plates are too weak to withstand the force produced by an arc blast and will be pulled out of their mounting holes or sheared off, allowing all the plates to collapse, completely blocking the air access route and preventing the arc blast from escaping through the grille.

Still other aspects, features and advantages of the present invention are readily apparent from the following detailed description, simply by illustrating a number of exemplary embodiments and implementations, including the best mode contemplated for carrying out the present invention. The present invention also is capable of other and different embodiments, and its several details can be modified in various respects, all without departing from the spirit and scope of the present invention. Accordingly, the drawings and descriptions are to be regarded as illustrative in nature, and not as restrictive.

DETAILED DESCRIPTION

As an initial matter, it will be appreciated that the development of an actual, real commercial application incorporating aspects of the disclosed embodiments will require many implementation specific decisions to achieve the developer's ultimate goal for the commercial embodiment. Such implementation specific decisions may include, and likely are not limited to, compliance with system related, business related, government related and other constraints, which may vary by specific implementation, location and from time to time. While a developer's efforts might be complex and time consuming in an absolute sense, such efforts would nevertheless be a routine undertaking for those of skill in this art having the benefit of this disclosure.

It should also be understood that the embodiments disclosed and taught herein are susceptible to numerous and various modifications and alternative forms. Thus, the use of a singular term, such as, but not limited to, "a" and the like, is not intended as limiting of the number of items. Similarly, any relational terms, such as, but not limited to, "top," "bottom," "left," "right," "upper," "lower," "down," "up," "side," and the like, used in the written description are for clarity in specific reference to the drawings and are not intended to limit the scope of the invention.

Figure 1:
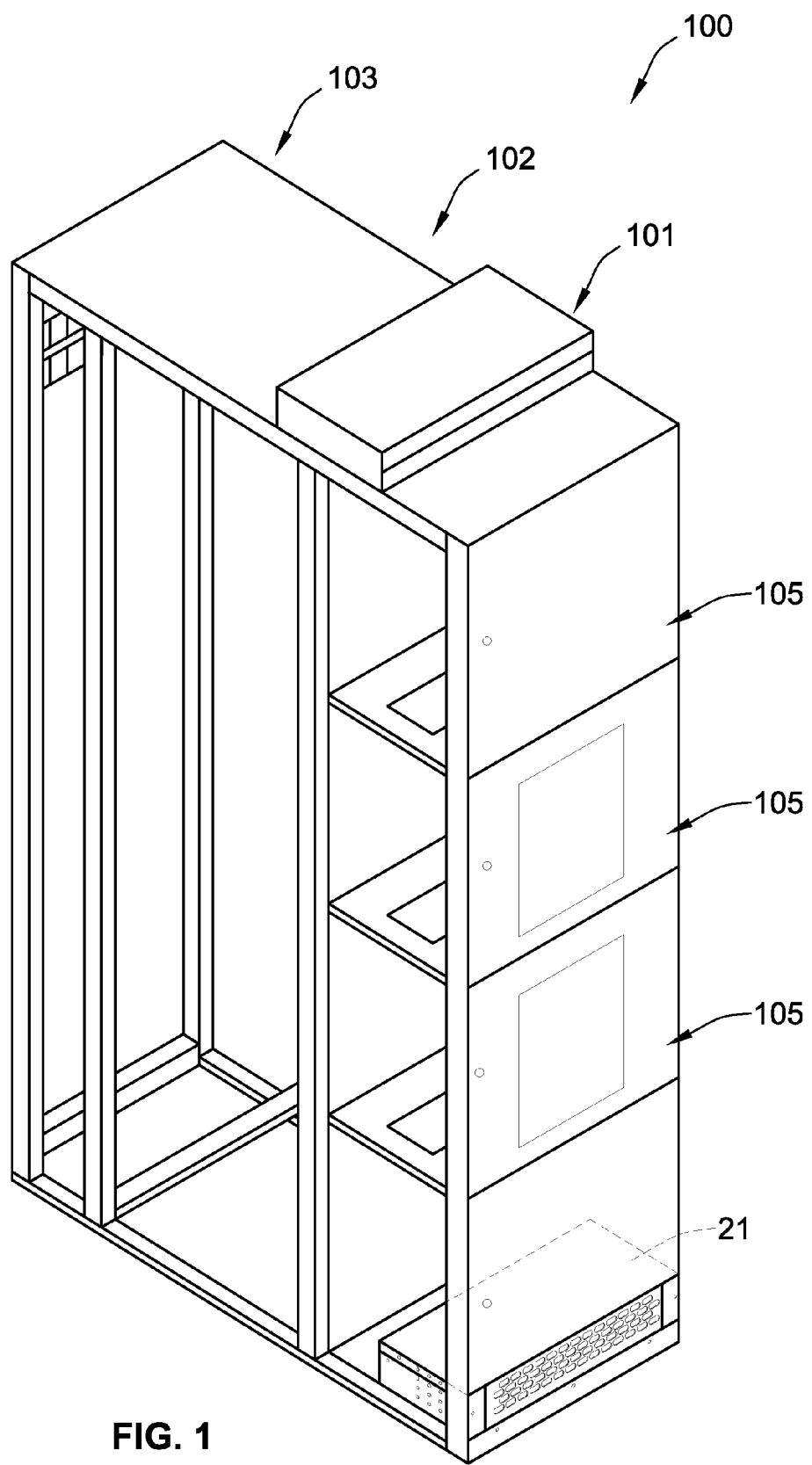
FIG. 1 shows an exemplary switchgear cabinet with a air vent of the present invention installed therein.

By studying the drawings, and with particular reference to FIG. 1, persons of ordinary skill in the art will understand that they are looking at an exemplary electrical enclosure such as a bare switch gear cabinet 100 without side panels or equipment. The enclosure shown having a breaker section 101 for containing circuit breakers or other electrical equipment, a bus section 102 for distributing power to the various electrical equipment, and a cable section 103 for accepting and distributing line power. The switch gear cabinet 100 or a section thereof may serve as a cabinet protecting various parts of the electrical equipment or conductors from the outside environment as known in the art. To aid in cooling the electrical connections within the breaker section 101 an arc resistant air vent 21 according to the present invention is placed at the bottom thereof to allow for cooling outside air to circulate through the enclosure when in operation.

Figure 2:
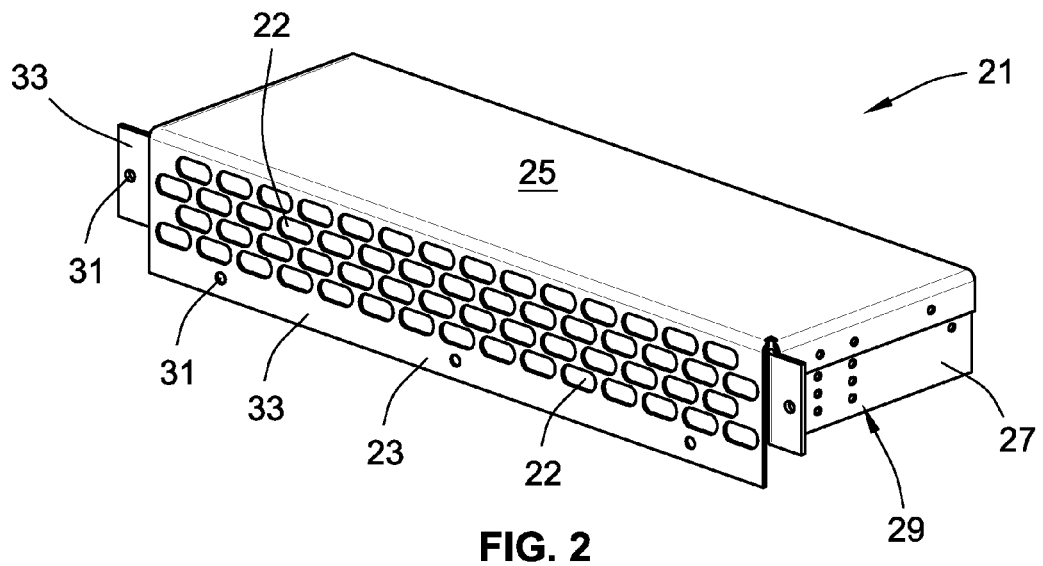
FIG. 2 shows a right side top perspective view of a air vent of the present invention.

Referring to FIG. 2, the air vent 21 can be seen as a box-like plenum 24 where the plenum front is covered by a vertical plate with multiple slots 22 arranged to from a grille 23, allowing air and wind-blown or sprayed water into the front of the air vent 21. In this aspect of the present invention the top wall 25 forms a top wall of the plenum and is contiguous with the plate of the grille 23 which allows air into the front of the vent 21. A side wall 27 is shown with holes 29 for hanging baffle plates in the interior of the plenum 24 as further explained below. The front wall or grille 23 is provided with mounting holes, collectively 31, located at bracket like extensions, collectively 33, for anchoring the air vent 21, such as by threaded fasteners, to the frame of the switchgear cabinet 100. The plenum enclosure and entire vent structure and its fastenings are built to withstand rupture during an arc blast which may occur within the electrical enclosure 100.

Figure 3:
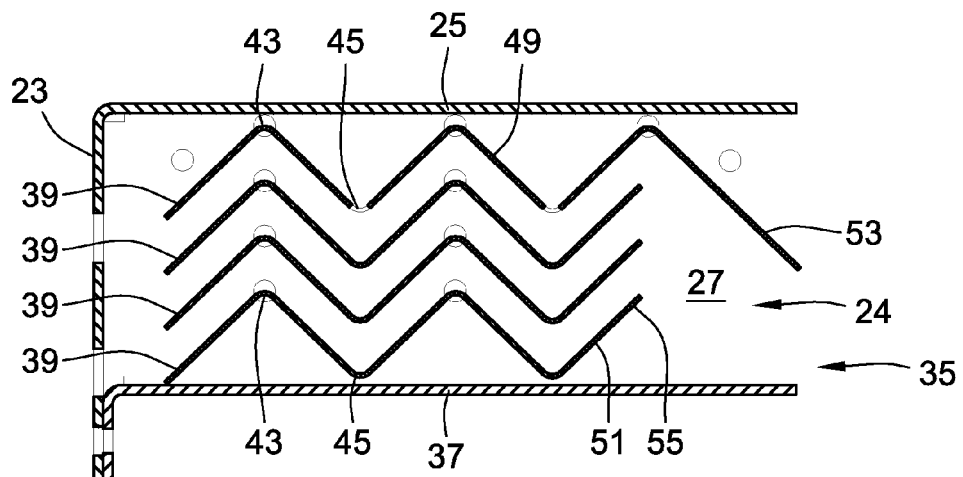
FIG. 3 shows a cross section of the air vent.
Figure 4:
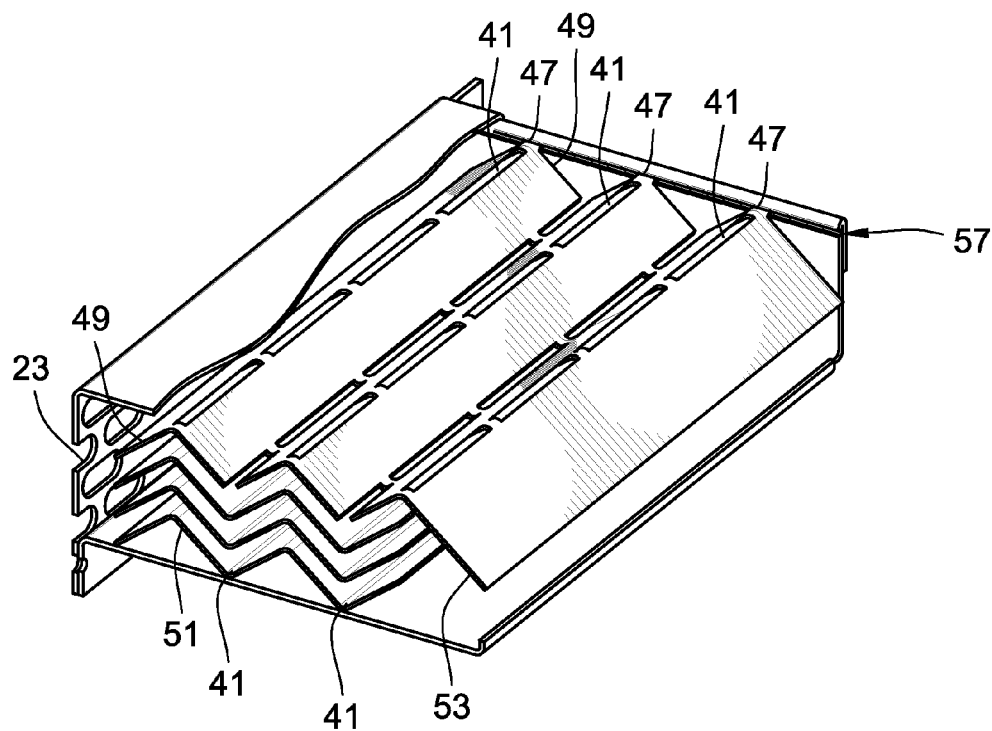
FIG. 4 is a right side top perspective cut away view of the air vent with the right wall sectioned away and the top wall in phantom [or removed].
Figure 5:
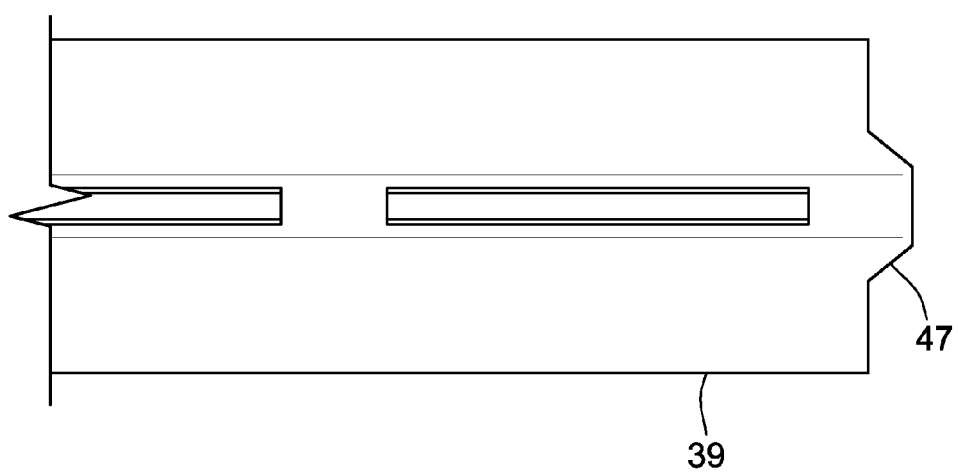
FIG. 5 is a detail of the exemplary tabs on the plates.

Referring to FIGS. 3 and 4, the air vent 21 is cut away to show the box-like plenum interior with the grille 23 in place at the front. The rear "wall" 35 of the plenum is an open space to allow air to pass through to the interior of the electrical enclosure. The floor or bottom wall 37 of the plenum 24 preferably forms a tray-like structure with three sides, at the back and side walls of the plenum but with no lip at front grille 23 so that collected water can only flow out the front as further explained below. A stack of baffle plates, collectively 39, are suspended in the plenum 24. The baffle plates 39 are corrugated plates stacked in spaced, and preferably parallel, relationship with a gap between each plate that is less than the height of the corrugation.

Each plate 39 has a plurality of perforations or slots 41 along each ridge 43 and furrow 45 of the corrugations, i.e. at the turning points of the plates. The perforations serve the dual function of allowing water stopped by the baffles to drip downward through the stack onto the bottom wall 37 and to weaken the plates thereby producing an accordion hinge in each plate to allow a folding of the plates together as they are compressed under the force of an arc blast in the switchgear cabinet traveling into the air vent.

Each ridge 43 has an attachment tab 47 at both the left and right sides of the respective plate for connection with a corresponding side wall 27 of the plenum 24 to maintain the spaced relationship normal conditions. It will be appreciated that the tabs 47 might be placed at the end of the furrows 45 instead of, or in addition to, the tabs on the ridges. In the illustrated embodiment the tabs 47 are angled points inserted into holes in the side walls 27. However, the tabs are designed to be too weak to maintain connection integrity with the sidewalls 27 under a force produced by an arc blast. The tabs could be thinned, scored, twisted, tacked on, or otherwise weakened to fail by design under the arc blast force, allowing the plates to collapse in an accordion fold towards the grille, completely blocking the plenum and preventing the arc blast from escaping through the grille.

Within the stack of corrugated baffle plates, one of the uppermost 49 or lowermost 51 plates, i.e. a plate on the outside of the stack, here upper plate 49, ends in an extended fold 53 toward the back wall 35 of the plenum 24 so as to be capable of contacting the last fold 55 of an opposite outside plate in the stack, here bottom plate 51, when bent towards the front wall, i.e. grille 23 under the force of an arc blast. It will be noted that in the embodiment illustrated in FIG. 4, the side wall 27 provides a sliding track 57 for the insertion of the plate tabs 47 thus allowing the top plate 49 to maintain its level within the plenum upon compression towards the front wall. It will be appreciated that the sides might have a top (or a bottom) track to anchor outside on or more outside plates, and that the outside plate with the extended fold could operate from the top or bottom of the plenum. It will further be noted that the illustrated number of baffled plates is somewhat arbitrary and the selected number of plates for a given application may vary.

While particular aspects, implementations, and applications of the present disclosure have been illustrated and described, it is to be understood that the present disclosure is not limited to the precise construction and compositions disclosed herein and that various modifications, changes, and variations may be apparent from the foregoing descriptions without departing from the scope of the disclosed embodiments as defined in the appended claims.

The invention claimed is:

1. An arc resistant air vent for an electrical enclosure comprising:
   a) a plenum enclosure built to withstand rupture during an arc blast, with an open front wall and an open back wall, and side walls arranged to accept and support corrugated baffle plates;
   b) a grille covering the open front wall of the plenum,
   c) a stack of baffle plates in the plenum being corrugated plates stacked in a spaced relationship, each plate having a plurality of perforations along each ridge and furrow of the corrugations, and each ridge or furrow, or both, having an attachment tab at both sides for connection with a corresponding side wall of the plenum to maintain the spaced relationship normally but which are too weak to maintain connection integrity under a force produced by an arc blast;
   d) with one of the uppermost or lowermost plates being an outside plate and ending in an extended fold toward the back wall of the plenum capable of contacting the last fold of an opposite outside plate in the stack when bent towards the front wall; and
   e) whereby the perforations and tabs produce an accordion hinge to allow a folding of the plates together under the force of the arc blast in the electrical enclosure.

2. The air vent according to claim 1 further comprising a bottom wall being a drip pan open only to the grille.

3. The air vent according to claim 1 wherein the baffle plates are stacked in a parallel relationship.

4. The air vent according to claim 1 wherein there is a gap between each baffle plate that is less than the height of the corrugation of the plate.

5. The air vent according to claim 1 further comprising a switchgear cabinet to which the air vent is anchored.

6. The air vent according to claim 1 wherein the side walls have holes for accepting at least some of the attachment tabs.

7. The air vent according to claim 1 wherein the side walls have tracks for accepting at least some of the attachment tabs.

* * * * *